United States Patent [19]

Law

[11] 4,107,711
[45] Aug. 15, 1978

[54] PHOTOGRAPHIC CAMERA FOR TAKING THREE DIMENSIONAL PHOTOGRAPHS AND METHOD AND APPARATUS FOR FORMING TRIVISION IMAGES

[76] Inventor: Chi Yin Law, No. 35-5, Koishikawa, 5-chome, Bunkyo-ku, Tokyo-to, Japan

[21] Appl. No.: 669,864

[22] Filed: Mar. 24, 1976

[30] Foreign Application Priority Data

Mar. 28, 1975 [JP] Japan ................................ 50-37644
May 28, 1975 [JP] Japan ................................ 50-64698

[51] Int. Cl.² ............................................. G03B 35/00
[52] U.S. Cl. .................................. 354/112; 354/123; 355/22; 355/77
[58] Field of Search ............... 354/115, 123, 124, 125, 354/112; 355/22, 46, 77; 35/2

[56] References Cited

U.S. PATENT DOCUMENTS

| | | | |
|---|---|---|---|
| 3,503,316 | 3/1970 | Takano et al. | 354/112 |
| 3,521,947 | 7/1970 | Jones | 354/112 |
| 3,528,736 | 9/1970 | Jones | 355/22 |
| 3,564,988 | 2/1971 | Jones | 354/115 |
| 3,590,712 | 7/1971 | Ataka | 354/125 |
| 3,596,584 | 8/1971 | Jones et al. | 35/2 |
| 3,678,833 | 7/1972 | Leach | 354/112 |
| 3,683,772 | 8/1972 | Jones | 354/112 |
| 3,685,413 | 8/1972 | Matsunaga et al. | 354/112 |
| 3,731,606 | 5/1973 | Geoffray | 354/112 X |
| 3,978,500 | 8/1976 | Brachet | 354/123 |

*Primary Examiner*—Richard A. Wintercorn
*Attorney, Agent, or Firm*—Christie, Parker & Hale

[57] ABSTRACT

A photographic camera for three dimensional photography on fixedly positioned photosensitive material. A screen having a plurality of lenticular elements with the boundaries of adjacent elements forming lines defining stripe portions is located in the light path from the object to be photographed and positioned closely adjacent to and in a fixed relationship to the surface of the photosensitive material. A shutter having a substantially rectangular aperture interrupts light passing through an objective, the screen and onto the photosensitive material. The objective's effective aperture defined by parallel planes at opposite sides of the optical axis and transverse to the stripe portions enables a reversed image to be produced on the photosensitive material by a single exposure. The reversed three dimensional original image upon development is positioned closely adjacent fresh photosensitive material. A lenticular screen having substantially the same optical characteristics as that used in the camera is positioned in the light path immediately adjacent a side of the original which is opposite from the fresh photosensitive material. At least two of the elements including screen, original photosensitive material and beam of light are moved relative to at least two elements and moved relative to the remaining elements to create a non-reversed three dimension image on the fresh photosensitive material.

A method involving the photographing and reversing of the reversed three dimension image are also disclosed.

30 Claims, 9 Drawing Figures

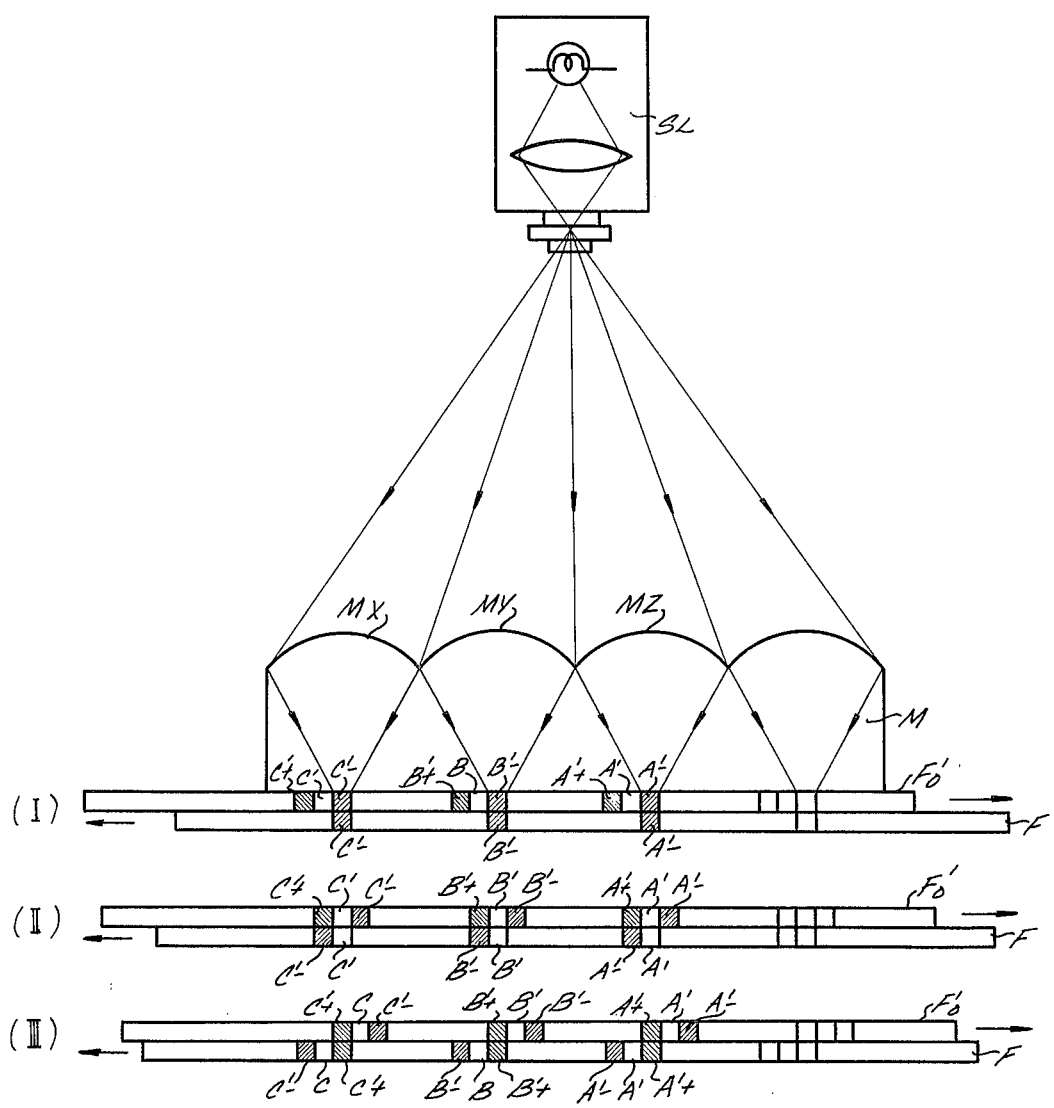

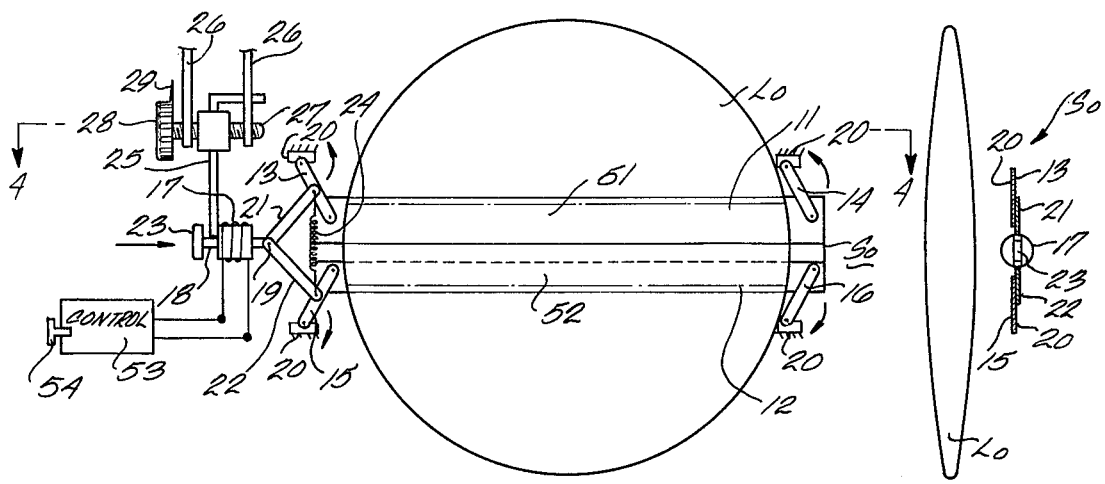
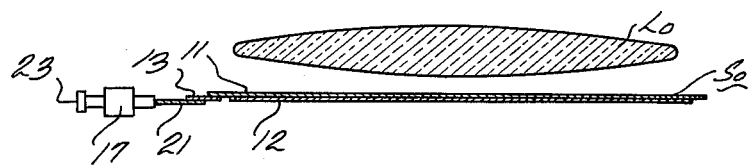

PHOTOGRAPHIC CAMERA FOR TAKING THREE DIMENSIONAL PHOTOGRAPHS AND METHOD AND APPARATUS FOR FORMING TRIVISION IMAGES

BACKGROUND OF THE INVENTION

The present invention relates to a photographic camerwa for three dimension photography and a method and apparatus for forming a visible three dimension reproduction of an image using lenticular screens.

Three dimension photography is known in which two photographs are taken from two different viewpoints and are separately viewed by both eyes. The two photographs are usually photographed simultaneously from two viewpoints spaced a predetermined distance apart using two photographic cameras juxtaposed, or a single photographic camera having two objectives. This type of photography is known as stereoscopic photography. Three dimension, using lenticular screens, is distinguished from the aforementioned in that a single photograph is used which may be three dimensionally viewed directly by both eyes. Three dimension using lenticular lenses is obtained by forming a plurality of images arranged in stripes of one and the same object as viewed through various angular positions through a lenticular screen. The lenticular screen has a plurality of lenses or optical elements successively connected to one another, each of these optical elements being in the form of a semi cylinder having a diameter as small as 0.1 mm to 5.0 mm.

In three dimension using lenticular screens, the photograph (positive) itself has a lenticular screen covering the surface of the photograph. The three dimension effect is obtained during viewing by a function of the lenticular screen and the image on the surface of the photograph when being viewed through the lenticular screen. When photographing a scene on the surface of a photosensitive material, the normal camera exposes the scene reversed, not only laterally but vertically. If a lenticular screen is placed in front of the photosensitive material during exposure for three dimensional purposes, individual images formed by the individual elements of the lenticular screen also present a laterally reversed position relationship in the overall reverse image and accordingly cannot be directly used as the image for three dimensional viewing. The reversed image formed by individual lenticular elements is referred to herein as a "reversed three dimensional image".

Measures have been taken to obtain the desired trivision image without the formation of the reversed three dimensional image. One proposed apparatus has a lenticular screen placed in front of a photosensitive material which is moved synchronously with movement, over a desired distance, of a shutter or a slit adapted to move across an objective by unit width of said reticular elements in photographing and thereby an object image which would otherwise be projected as the corresponding reversed three dimensional image is projected as a corresponding normal three dimensional image.

Another proposed apparatus provides a mask (screen) with a slit interposed between a lenticular screen and photosensitive material. The mask is moved relative to the photosensitive material for the time duration of a single shutter opening. The amount of movement of mask and photosensitive material is selected from multiples of a unit width of the lenticular elements. As a result a reversed three dimensional image is converted into a normal three dimensional image.

Either of the aforegoing proposed apparatus eliminates the inconvenient operation usually essential to obtain a directly viewable three dimension image.

In the usual apparatus an object to be photographed or the camera itself is rotated in a circular arc while repeated exposures are made of the same object. With this arrangement the desired directly viewable three dimension image is obtained by a single photographing operation. However, such apparatus requires the synchronous movement of the lenticular screen for each scanning during which the shutter is moved across the objective and the relative synchronous movement, among the lenticular screen, the mask provided with the mask, and the photosensitive material. As a result, these apparatus are not suitable for photographing moving objects nor for momentary photographing using a strobe light or flash in which the emission period is shorter than the period of movement of the respective members. Also, this results in a camera of too high a cost to be commonly used and the camera and equipment parts would not be easy to carry.

SUMMARY OF THE INVENTION

The aforegoing disadvantages are effectively avoided according to the present invention. In an embodiment of the present invention the desired three dimension is obtained independently of the manner of photographing or the object to be photographed. Thus, for example, it is possible to take pictures under strobe light or flash and it is possible to photograph a moving object. According to a preferred embodiment of the invention, a camera mechwnism is provided which obtains the three dimension using a simplified arrangement at low cost to thereby permit popularization of three dimension of the direct visual type. Additionally, an embodiment of the invention provides a metod and apparatus by which the image obtained by a camera mechanism embodying the invention is not only obtained at low cost but may be reproduced as many times as desired. The present invention is free from the prior concept that multiple exposures of the same object are required to obtain a directly viewable three dimension image.

In accordance with the present invention a photographic camera embodying the present invention is employed in a process that presupposes a reversed three dimensional image is intentionally obtained on the photosensitive material, making it unnecessary to displace the camera from different viewpoints or to rotate the object itself around its own axis.

Briefly, a method according to the present invention is for obtaining a three dimension reproduction of an object and includes the steps of forming a photographic image. The steps of forming the photographic image include positioning a lenticular screen, having predetermined optical characteristics, adjacent to an exposure surface of a photosensitive material and in fixed relative position to the photosensitive material and projecting an object image through such screen onto such surface to thereby expose and form a reversed three dimension image on the photosensitive material. Included is the step of reversing the reversed image. The step of reversing the reversed image includes the steps of positioning a lenticular screen having substantially predetermined characteristics, closely adjacent a developed form of the exposed photosensitive material containing the reversed three dimension image, positioning a surface of fresh photosensitive material closely adjacent to a surface of such developed form of photosensitive mateerial which is opposed from the lenticular screen, projecting a beam of light through the lenticular screen, and through the developed form of photosensitive material to a surface of the fresh photosensitive material and, while projecting, moving at least two of the following: the lenticular screen, the developed form of photosensitive material, the fresh photosensitive material, and the beam of light. The relative movement is made between the at least two elements and relative to the other elements to thereby reverse the reversed three dimension image and create a non-reversed three dimension image on the fresh photosensitive material.

Briefly, an apparatus according to the present invention is for obtaining a non-reversed three dimension photographic image of an object. Photographing means includes means for positioning an exposure surface of a photosensitive material for exposure. An objective directs an object image to be photographed along a path toward such positioned exposure surface. A lenticular screen is positioned in between the positioned surface and the objective along the path and immediately adjacent to such positioned exposure surface. The positioned photosensitive material, the screen, and the objective are maintained in fixed relative position while the shutter is opened and closed for exposure. The screen has a predetermined optical characteristic and projects the object image as a reversed three dimension image on the positioned exposure surface. To reverse the reversed three dimension image, an exposure surface of fresh photosensitive material is positioned. A light beam is directed along a path toward the positioned exposure surface. A surface of an original transparency carrying the reversed three dimensional image is positioned closely adjaent the positioned exposure surface of the fresh photosensitive material. A lenticular screen, having substantially the same predetermined optical characteristics as the first screen, is positioned in the path of the beam of light immediately adjacent a side of the original which is opposite from the fresh photosensitive material to thereby direct the beam of light through the original to the photosensitive material. Means is provided for relatively moving at least two of the elements including the lenticular screen, the original, the fresh photosensitive material, and the beam of light. The movement is relative to such at least t6wo elements and is relative to the others of the elements to thereby reverse the reversed three dimension image and create a non-reversed three dimension image on the fresh photosensitive material.

A photographic camera embodying the present invention is adapted to obtain three dimension at low cost and without the need for moving the camera or the object or moving parts within the camera. Significantly, a camera according to the present invention is possible at sufficiently low cost and size that it can e popularized with the ordinary user.

Briefly, a photographic camea for three dimension photography embodying the present invention includes means for positioning photosensitive material with a surface thereof for exposure. A lenticular screen is positioned in a path for light from an object to be photographed and is positioned closely adjacent to and in fixed relative position to such surface of the photosensitive material for projecting light onto such surface. The screen comprises a plurality of lenticular elements. The boundaries of adjacent elements form lines which define stripe portions. An objective is positioned in such light path for light for projecting the light through the lenticular screen onto the photosensitive material. A shutter interrupts the light from the surface and includes an arrangement for providing, when open, a substantially rectangular shaped aperture gap which extends along one dimension of the rectangular shape, transversely of the stripe portions and opens and closes with movement along the other direction of the rectangular shape. The objective has an effective aperture defined by a pair of planes extending parallel to each other at opposite sides of a main optical axis and transversely to the stripe portions so that a single exposure by opening of the shutter enables the light to be projected onto the photosensitive material as a reversed image.

DESCRIPTION OF DRAWINGS

FIG. 1 illustrates the manner in which the multiple reversed three dimensional images of an object to be photographed are projected by the optical system onto the surface of photosensitive material;

FIG. 2 is a schematic representation partially in cross-section, illustrating the process and optical exposure system by which the reversed three dimensional images on an original developed transparency are converted into corresponding normal three dimensional images to obtain a print. The reversed three dimensional image results from the exposure of the photosensitive material in the photographic camera of FIG. 1;

FIG. 3 is a schematic and elevation view taken along lines 3—3 in FIG. 1, showing a rear elevation of a portion of the shutter and objective system and embodying the present invention;

FIG. 4 is a cross-sectional view taken along the lines of FIG. 3 showing the objective, the shutter blades, the links 11, 12 and 21, and the electromagnet 17, the links 14 and 16 removed for clarity;

FIG. 5 is a right side elevation view of the apparatus of FIG. 3 showing the objective $L_0$, shutter mechanism, and control elements of FIG. 3 with the control knob 28, diaphragm 25, supports 26, screw 27, links 13, 14, 15 and 16, and blades 11 and 12, removed;

DESCRIPTION OF THE INVENTION

Figure 1:
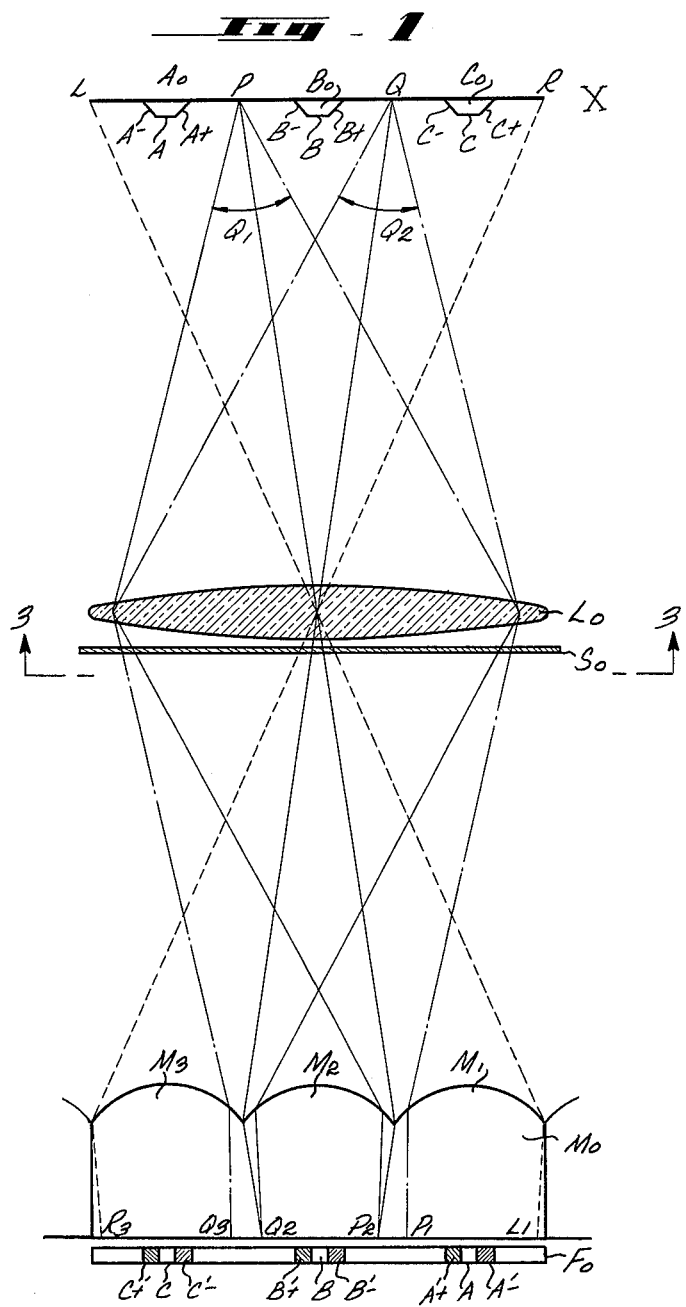
FIG. 1 is a schematic and cross-sectional view of a photographic camera showing particularly the optical system and embodying the present invention.

FIG. 1 is a schematic and block diagram of a photographic camera embodying the present invention and illustrating the manner in which an object to be photographed appears when being photographed. Specifically, FIG. 1 schematically illustrates an object X to be photographed. Within the camera there is shown an objective lens $L_0$, a shutter $S_0$ located behind the objective, an enlarged lenticular screen $M_0$, and photosensitive material $F_0$. The shutter $S_0$ is located behind the objective $L_0$ and is adapted to be opened and closed transversely of the optical axis of the objective $L_0$. Details of the shutter will be described.

Figure 6:
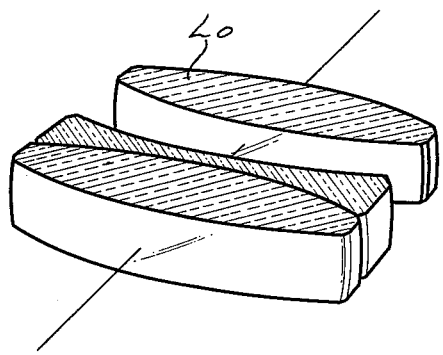
FIG. 6 is a perspective view of an alternate objective lens which may be used in a photographic camera embodying the present invention.

Preferably, the objective $L_0$ is of the type shown in FIG. 6 which is cut along two planes extending parallel to the main optical axis of the objective $L_0$. To be explained with respect to FIG. 3, the circular objective lens depicted in FIG. 1 has an effective aperture defined by a pair of parallel planes positioned symmetrically about the axis of the lens. Correspondingly, it is preferred that the shutter $S_0$ be adapted to be opened and closed transversely of such parallel planes. To be explained with respect to FIGS. 3 and 7, the shutter when opened defines a slit having upper and lower opposing sides which extend parallel to each other and parallel with such parallel planes of the objective $L_0$. It will be understood that, in accordance with the broader concept of a method according to the present invention, such a combination of lens and shutter, although preferred, is not essential.

Consider now the lenticular screen $M_0$. The lenticular screen is well known and comprises a plurality of continuously arranged and assembled lens elements each having the form of a fine long semi cylinder extending perpendicular to the paper as viewed in FIG. 1. Each element in cross-section forms a circular arc and is of uniform and narrow width along its length the width being in the order of 0.1 mm to 5.0 mm. The boundary lines of adjacent lens elements corresponding to opposite ends of each cross-sectional circular arc define a plurality of stripes extending parallel to one another and transversely to the cutting planes of the objective $L_0$ discussed with respect to FIG. 6. With such an optical arrangement the light rays coming from an object to be photographed pass through, upon opening of the shutter $S_0$, the objective $L_0$ to the lenticular screen $M_0$ through the lenticular screen to the sensitized surface of the photosensitive material $F_0$. As the light rays pass along this path the light rays are subjected to a refraction in the objective $L_0$ and in the lenticular screen $M_0$.

Consider now the manner in which the image formation occurs on the photosensitive material $F_0$. Consider the path of light between points P and Q on the object to be photographed. Light rays from point P which are incident upon the objective $L_0$ are included with a beam of light $\theta_1$ covering the objective aperture of the objective $L_0$. The light rays coming from the point Q which are incident upon the objective $L_0$ are included within another light beam $\theta_2$. The lenticular screen $M_0$ is depicted in FIG. 1 in enlarged schematic form for illustration. Although three elements $M_1$, $M_2$ and $M_3$ are shown by way of example, it will be understood that the lenticular screen is large enough to cover the entire area of the photosensitive material $F_0$ to be exposed and includes a large number of elements much greater than that depicted in FIG. 1. Considering the serially arranged elements $M_1$, $M_2$ and $M_3$, consider that portion of the two light beams which passes through element $M_2$. The portion of the light rays coming from points P and Q and centrally passing through the objective $L_0$ is refracted by the element $M_2$ of the screen $M_0$ and strikes points $P_2$ and $Q_2$, respectively, on the photosensitive exposure surface of the photosensitive material $F_0$. This is depicted by the solid lines in FIG. 1.

Consider now the beam $\theta_1$ coming from the point P. The light rays extending to the right side of objective $L_0$, depicted by broken lines, strike the element $M_1$ of the lenticular screen which refracts such light rays so as to strike point $P_1$. If it were not for the element $M_1$, such light rays would strike the photosensitive surface at the area underneath the element $M_2$ rather than $M_1$.1 Similarly, the light rays from the beam $\theta_2$ from point Q which otherwise would strike the photosensitive surface underneath the element $M_2$, but which strike the element $M_3$, are refracted in passing through element $M_3$ so as to strike at point $Q_3$ on the photosensitive surface $F_0$. The discussion with respect to the three elements $M_1$, $M_2$ and $M_3$ is provided only by way of explanation and it will be understood that actually the elements $M_1$, $M_2$ and $M_3$ are much smaller with respect to the objective $L_0$ than depicted and that there are a great many more such elements arranged successively and symmetrically about the lenticular element $M_2$ and form the projected images of the points P and Q in each element.

It is known that a plurality of projected images of the points P and Q are formed, one by each of the lenticular elements. However, the projected image thus formed in every lenticular element is a laterally reversed image which can not be directly viewed as the desired three dimensional image.

Consider the image reversal in more detail with respect to element $M_2$. The images of surfaces B, B−, and B+ located at $B_0$ of the object being photographed, and which lie between the points P and Q, are formed in the reverse order as depicted at B′+, B′−, and B on the photosensitive surface $F_0$. As a result the image of the surfaces B′+ is formed near the image point $Q_2$ and the image of the surface B′− is formed near the image point $P_2$. Similar arrangements are depicted for $A_0$ and $C_0$ of the object X. Because of the reversal by each element of the lenticular lens, it is impossible to view the image of the developed photosensitive material even though a lenticular screen of the type shown at $M_0$ is placed over the image. This is true since, for example, $B_0$ is reversed under element $M_2$, $C_0$ is reversed under element $M_3$, and $A_0$ is reversed under element $M_1$, as described above, which provides a transverse image reversal to the viewer's eye and is therefore a reversed three dimensional image with respect to the actual object X being photographed.

According to the method embodying the present invention a reversed three dimensional image is intentionally obtained in photographing as shown and described with respect to FIG. 1. The reversed three dimensional image is converted in the process of printing into the corresponding normal three dimensional image, which is not reversed, so that it may be directly three dimensionally viewed. The method and apparatus embodying the present invention takes the reversed three dimensional image and converts the reversed three dimensional image into the corresponding normal three dimensional image during the printing operation.

Refer now to FIG. 2 and consider the way in which the reversed three dimensional image formed on the surface of the photosensitive material $F_0$ is reversed and thereby converted to the corresponding normal, unreversed, three dimensional image. According to the present invention, many sheets with identical three dimension images are obtained through the image reversion and printing processes. Accordingly the original carrying thereon the reversed three dimensional image obtained by the photographing operation is preferably a negative whether a monochromatic photograph or a color photograph is desired.

SL designates a spot light serving as a light source for printing.

The exposed image on the photosensitive material $F_0$ of FIG. 1 is first developed, forming a negative or transparency which forms the original $F_0'$ depicted in FIG. 2. The original $F_0'$ carries the image projected on the photosensitive material $F_0$ in FIG. 1 as a laterally reversed image. A lenticular screen M having optical characteristics substantially the same as the lenticular screen $M_0$ depicted in FIG. 1 is placed immediately or closely adjacent, preferably in contact with, a surface of the original $F_0'$ in the path of the beam of light between the original $F_0'$ and the spot light SL. An exposed surface of fresh photosensitive material F is positioned on the opposite side of the original $F_0'$ from the lenticular screen M. The fresh photosensitive material F is positioned with its sensitized surface positioned parallel with and closely adjacent, preferably in contact with, the opposite surface of the original $F_0'$ from the lenticular screen M.

It will be obvious to those skilled in the art that the device of FIG. 2 including the fresh photosensitive material F must be placed under perfect darkness under an arrangement in which the fresh photosensitive material F is not exposed.

With this arrangement the reversed three dimensional image on the original $F_0'$ is easily converted and printed as a corresponding normal three dimensional image simply by relatively moving two of the elements including the spot light SL, the lenticular screen M, the original $F_0'$, and the fresh photosensitive material F. In the disclosed embodiment of the invention, the reversed three dimensional image is converted to a directly viewable three dimensional image by relatively moving the original $F_0'$ to the right and moving the fresh photosensitive material F to the left as viewed in FIG. 2 while the spot light SL is lit. Movement of the original $F_0'$ and photosensitive material F is at right angles to or transversely of the stripes defined by the boundary lines of the semi cylindrical lenticular elements which constitute the lenticular screen M.

When the condensed beam coming from the spot light SL is directed onto the lenticular screen M, the light rays pass through each individual lenticular element and converge on a line extending in parallel to the stripe for each lenticular element. Each beam thus converging in a straight line is incident through the original $F_0'$ upon the surface of the fresh photosensitive material F in accordance with the projected image of the original $F_0'$. The exposure is effected successively by the respective straight line light beams formed by the lenticular elements while the original $F_0'$ and the fresh photosensitive material F are moved as described above until a desired photograph is obtained. A better understanding of the way in which the projected image on the original $F_0'$ is converted from the reversed three dimensional image to the corresponding normal three dimensional image will become apparent from the following description.

Consider $A_0$, $B_0$ and $C_0$ of the object to be photographed depicted in FIG. 1 and the way in which they were formed on the photosensitive material $F_0$ during exposure in FIG. 1. As depicted in FIG. 1 the surfaces of $A_0$, $B_0$ and $C_0$ are each reversed in a transverse direction under each of the lenticular elements. The reversed images depicted on the photosensitive material $F_0$ of FIG. 1 are depicted on the original $F_0'$ in FIG. 2. FIG. 2 depicts in three steps identified at (I), (II) and (III), the steps of reversing the images $C'+$, $C'$, $C'-$, and $B'+$, B, $B'-$, and $A'+$, $A'$, and $A'-$. In the first step, as depicted at (I), three light beams are projected one by each of the lenticular elements MX, MY and MZ. Each beam is projected from the spot light SL in the form of a straight line, striking the left images $C'-$, $B'-$, and $A'-$ on the original $F_0'$. As a result the left images $C'-$, $B'-$, and $A'-$ are exposed on the fresh photosensitive material F, converting the negative into the corresponding positive. Subsequently the original $F_0'$ and the fresh photosensitive material F are relatively moved to the right and left, respectivey, to the position depicted at (II) in FIG. 2. The light beams are subsequently projected again from the spot light SL in three straight lines by the lenticular elements MX, MY and MZ, striking the middle images $C'$, $B'$, and $A'$ on the original $F_0'$. As a result the middle images $C'$, $B'$ and $A'$ are exposed on the fresh photosensitive material F. Subsequently the original $F_0'$ and the fresh photosensitive material F are relatively moved to the right and left where the right images $C'+$, $B'+$, and $A'+$ are exposed on the fresh photosensitive material F similar to that described with respect to the previous steps. After these three steps it will be seen that the reversed image on the original $F_0'$ has now been exposed and printed on the fresh photosensitive material F in the correct order. A photograph is formed in which the reversed three dimensional image has been reversed to the corresponding three dimensional image which can be three dimensionally viewed through a lenticular screen.

It will be understood that the aforegoing description and the schematic representation in FIG. 2 is a simplification of the actual apparatus in order to illustrate and expedite an understanding of the present invention. Actually the lenticular lens is much smaller than that depicted in FIG. 2 and includes many additional lenticular elements. As a result there are presented numerous reversed three dimensional images, one for each lenticular element. The exposure and printing are actually effected by a continuous relative movement of the original $F_0'$ and the fresh photosensitive material F at a uniform velocity and therefore every reversed image of each lenticular element is reversed and converted to the corresponding normal three dimensional image, instead of by the stepwise process.

Although the relative movement of the original $F_0'$ and the fresh photosensitive material F has been described as a relative movement in mutually opposite directions, it will be understood that the original $F_0'$ and the lenticular screen M depicted in FIG. 2 may be moved in a synchronous relative arrangement and in the same direction with the original $F_0'$ being moved at twice the velocity as that of the lenticular screen M. With such an arrangement the fresh photosensitive material F and the light beam SL are fixed relative to each other.

Alternately, the fresh photosensitive material F may be moved in a synchronous arrangement with the lenticular screen M with the fresh photosensitive material F being moved in the same direction and at a velocity twice that of the lenticular screen M with the original $F_0'$ and the light beam being fixed in position.

Alternately, the reversal and printing may be effected by moving the fresh photosensitive material F while synchronously moving the spot light SL, as the light source, linearly or in a circular arc with respect to the original $F_0'$ (carrying the reversed three dimensional image) and the lenticular screen, the latter two being fixed in position. As a result each beam is projected on the original $F_0'$ in parallel to the stripes formed by the lenticular elements and is moved in a direction opposite to the direction in which the spot light is moved. Such movement together with the movement of the fresh photosensitive material relative to the original and the projected light beams effects a conversion of the reversed three dimensional image to a corresponding normal three dimensional image and printing on the fresh photosensitive material F.

Instead of the last described arrangement of moving the spot light SL in a circular arc, the lenticular screen M, the original $F_0'$, and the fresh photosensitive material F may be disposed in an arc about an axis corresponding to the center of such circular arc so that the beams projected on the original $F_0'$ in straight lines may be moved from one end to the other of each lenticular element. Synchronously the fresh photosensitive material F is moved in a direction opposite to the direction in which each beam projected in a straight line is moved. With respect to such a relative movement of these components in the opposite directions, one of the following measures may also be employed as the case demands. One of the measures is while the original $F_0'$ and the beams are fixed, the fresh sensitive material F is moved relative to movement of the lenticular screen M. The other is a relative movement between the beams projected in straight lines and the fresh sensitive material F, with the original $F_0'$ and lenticular screen M being fixed, in order to effect the desired printing.

A light source is shown and described in respect to FIG. 2 as it is convenient for operation in a darkroom. However, it should be understood that there may be more preferably provided a light source adapted to be projected through the lenticular screen M which provides parallel beams transversely to the stripes of the lenticular screen M. It is most desirable to have the width of beams projected in straght lines as narrow as possible so that the beams, after passing through the image on the original $F_0'$, effect printing of a sharp image thereof on the fresh sensitive material F.

Thus it will be seen that a general arrangement has been disclosed in which at least two of the following elements are moved: the lenticular screen, the original, the fresh photosensitive material, and the light beam, and the movement is relative to the at least two elements as well as being relative to the remaining elements. As a result the reversed three dimensional image on the original is reversed to a normal unreversed three dimensional image as it is reproduced and printed on the fresh photosensitive material for viewing through a lenticular screen.

It will now be seen that the present invention requires neither a scanning machanism for image conversion in the camera itself nor a mechanism to effect synchronous operation of a slit above the surface of the photosensitive material and as a result, image conversion during the treatment in the darkroom allows the darkroom equipment to be simple and versatile and thereby enables use of the same darkroom equipment for other demands and needs of the user and provides three dimension at low cost.

Consider now in more detail the actual camera depicted in FIGS. 1, 3, 4 and 5. The objective $L_0$ of the photographic camera according to the present invention requires an aperture portion defined as a pair of planes extending in parallel to each other and transversely of the stripes formed by the individual lenticular elements on the screen $M_0$. The parallel planes of the aperture portion preferably extend in parallel to each other a distance from the main optical axis so as to maintain an excellent quality of the resulting photograph. Consequently, the objective $L_0$ may be in the form of a slender rectangle defined by cutting a circular objective along planes extending in parallel to each other transversely of the stripes of the lenticular screen as shown in FIG. 6. Alternatively a circular objective may be provided which has an area extending outwardly from the parallel aperture planes with the area extending outwardly from the parallel aperture planes covered so that no light is transmitted therethrough. It will be understood from the following description that the objective having a large diameter is preferable since a viewing angle determined by the distance between laterally opposite ends of the objective, with respect to an object to be photographed, is accordingly enlarged and the number of reversed three dimensional images formed by the individual lenticular elements is also increased to emphasize the three dimensional effect.

As it is understood from the principles explained by referring to FIG. 1, in order to effectively obtain three dimension photography, the larger the aperture of the lens the better, as it makes the beam of light $\theta_1$ or $\theta_2$ larger, and therefore a greater number of light rays strike underneath the lenticular elements to form a greater number of reversed three dimension images. However, the lens having such a large aperture is bulky and costly. On the other hand, to form the three dimension image the entire aperture area is not necessary, but only the center area of a certain width horizontaly along the diameter of the lens is used. Then the rest of upper and lower crescent shape areas of the lens are not used so that they may be eliminated. From this point of view, a lens in light weight and less costly is shown in FIG. 6.

Consider now the details of the shutter $S_0$ according to the embodiment of the present invention as shown in FIGS. 3–5. The shutter is of a type which is adapted to be opened and closed, substantially parallel with and along a radius from the main optical axis of the objective $L_0$ toward and away from the parallel planes of the optical aperture.

In the case of this invention, adjustment of the amount of light from the object to be photographed by a known iris diaphragm gives quite an adverse effect. With such a small circular aperture, the angle $\theta_1$, $\theta_2$, of the beams in FIG. 1 are made narrower, and as a result a less number of reversed three dimension images are formed underneath the lenticular elements. Thus it reduces the three dimension effect to a great extent. To eliminate this disadvantage, the function of the diaphragm used in this invention for adjusting the amount of light needs to be widened and narrowed in the direction transversely to the diameter of the lens in horizontal direction. Since the shutter in this invention is, as will be described later, adapted to also perform the latter function, it is arranged as described above. Such shutter is referred to hereinafter as the gap shutter. As a result the shutter defines when open a substantially rectangular shaped aperture gap which is elongated transversely to the stripes of the lenticular screen. Opening and closing of the rectangular gap is along the other dimension of the rectangular shape. The objective $L_0$ is of a large circular diameter as seen in FIG. 3. The shutter $S_0$ has a pair of generally rectangular shaped blades 11 and 12 elongated transversely of the stripe portions formed by the lenticular elements of the screen $M_0$. The blades 11 and 12 are of generally slender rectangular shape and are positioned immediately in front of the photosensitive material $F_0$ and behind the objective $L_0$. The two blades ovelap each other along their edges, as indicated by dashed lines, near the optical axis of the objective for shielding purposes. It will be understood that the photographic box generally depicted by dashed lines in FIG. 1 must be kept light-tight by coating the objective over the area extending outward of the area defined by broken lines 51 and 52 in FIG. 3. As an alternate to coating, the areas outward from the broken lines 51 and 52 may be covered with suitable light shielding members.

As depicted in FIG. 3, the opposite ends of the blades 11 and 12 are pivotally supported to the camera body or a part of the shutter casing, by means of links 13, 14, 15 and 16. A pivot is provided at each end of the links 13, 14, 15 and 16 one end of each link being pivoted to the camera body or shutter casing and the opposite end of each link being pivotally mounted to an end of the corresponding blade. The pivot points at each end of the blades are depicted by dots in FIG. 3

In this manner the upper blade 11 is moved from its closed position to its open position as the links 13 and 14 are rotated about their pivots. Similarly, the lower blade 12 is moved from its closed position to its open position as the links 15 and 16 are rotated about their pivots. Intermediate links 21 and 22 have one end of each pivotally mounted at substantially the middle in between the pivots on the links 13 and 15, respectively. The intermediate links 21 and 22 are in turn pivoted at their opposite ends about a pivot 19 affixed at an end of a driving lever 18. An electromagnet 17 is provided for slidably driving the lever 18 centrally of the electromagnet to the right in order to move the pivot 19 to the right as viewed in FIG. 3, thereby rotating the links 21 and 22 and hence the links 13 and 15 which in turn opens the blades 11 and 12. The armature for th electromagnet 17 is depicted at 23 and is affixed to the driving lever 18. A restoring spring 24 is connected in between the pivot point between the levers 21 and 13 and the pivot point of the levers 22 and 15. It will be seen that the electromagnet 17, and links 21 and 22 acting on the links 13 and 15, will actuate the blades apart without requiring similar structure for the links 14 and 16. Similarly, the restoring spring 24 will restore the springs to a closed position without requiring an additional restoring spring for the links 14 and 16.

A diaphragm regulatin lever 25 serves as a control member for movement of the armature 23. The lower end of the diaphragm regulating lever 25 projects in the path of movement of a shoulder on the armature 23. A screw 27 is threaded through supporting members 26, 26 on the shutter casing. The screw 27 is suspended between the parts 26, 26 and extends through the upper end of the diaphragm regulating lever 25 in between the parts 26, 26. A threaded connection (not shown) is provided in between the upper end of the diaphragm regulating lever 25 and the screw 27 so that as the screw 27 is rotated, the diaphragm regulating lever 25 is laterally moved. As a result, the lower end of the diaphragm regulating lever 25 can be adjusted to a desired position and the extent to which the armature 23 is moved by the attractive force of the electromagnet 17 is controlled. The farther to the right to which the diaphragm regulating lever 25 is positioned, the greater the extent to which the armature 23 will move under magnetic attraction by the electromagnet 17, and the larger the extent to which the blades 11 and 12 are moved apart from each other. The farther to the left by which the diaphragm regulating lever 25 is positioned, the lesser the armature 23 will be allowed to move under magnetic attraction by the electromagnet, thereby limiting the amount by which the blades 11 and 12 are moved away from each other. The smaller the movement of the blades, the smaller the allowed size of the aperture gap or slit defined by the blades.

A diaphragm regulatin knob 28 is mounted at the left end of the screw 27 and includes an index 29 for indexing a diaphragm scale (not shown) provided around the periphery of the diaphragm regulating knob 28 for use in correctly setting the extent to which the blades are allowed to move away from each other.

With this arrangement, the diaphragm regulating lever 25 controls the extent to which the shutter blades 11 and 12 open and hence defines the size of the aperture, in a vertical direction, when the electromagnet 17 is excited. As a result, blades 11 and 12 actually serve in addition as a diaphragm to control the amount of incident light as well as forming a shutter.

It will be understood that the amount by which the shutter blades 11 and 12 are allowed to move apart may be controlled in other ways than that shown in FIG. 3.

Figure 7:
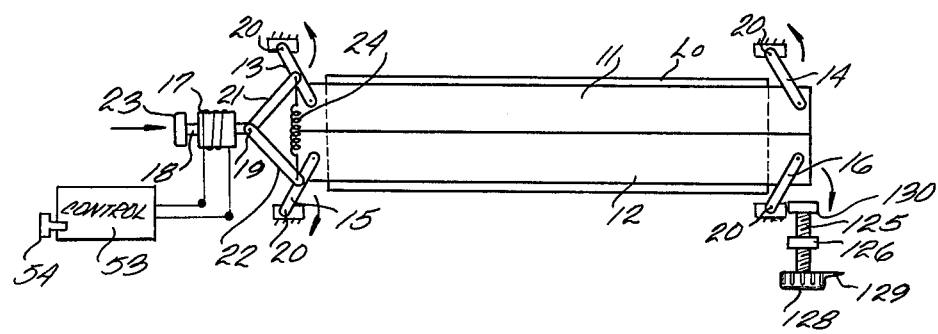
FIG. 7 is a rear elevation view similar to FIG. 3 showing an alternate embodiment of the present invention.

One alternative is disclosed in FIG. 7. FIG. 7 shows an objective $L_0$ of the type depicted in FIG. 6. A part 126 of the shutter casing has a thread therethrough (not shown) through which a screw 125 is threaded for directly regulating the allowed displacement of the blades 11 and 12. The screw has, on one end, a diaphragm value regulating knob 128, and the opposite end 130 is positioned within a range in which the lower blade 12 is moved. As in the prior embodiment, a diaphragm scale (not shown) is provided around the periphery of the knob 128 opposite an index 129 on the knob so that the correct setting of the screw 125 may be achieved. The screw 125 and hence the blade regulating end 130 are actually moved in response to rotation of the knob 128. An electromagnet with armature 23, a driving lever 18, blade links 13, 14, 15 and 16, and intermediate links 21 and 22, are provided and arranged in substantially the same manner as that depicted and described with respect to the prior embodiment of FIG. 3.

In the course of opening the blades, upon actuation of the electromagnet 17, the diaphragm regulating screw member 25 restrains the movement of the blades so that exposure may be achieved with a desired diaphram aperture determined by the setting of knob 128. Upon de-energization of the electromagnet 17, the restoring spring 24 urges the intermediate links 21 and 22, and accordingly the blades 11 and 12, together, as described with respect to FIG. 3 thereby effecting closure of the shutter.

The time duration during which the electromagnet 17 is energized gives an exposure time, and the extent to which the blades 11 and 12 are opened determines, together with the time duration, an amount of exposure. Thus a control unit 53 is connected to the electromagnet of FIGS. 3 and 7 and includes conventional circuits triggered by a camera shutter control button 54 for exciting the electromagnet for a time duration according to automatic or manually set exposure time required for proper exposure.

Although the mechanism in which the blades 11 and 12 are moved away from each other has been given by way of example in the preferred embodiment, it will be obvious that the present invention includes various modifications in design within the scope of the invention. For example, an alternate arrangement may have only one of the blades movable or the shutter may comprise a single blade, movement of which provides an aperture gap serving as a slit for exposure.

Figure 8:
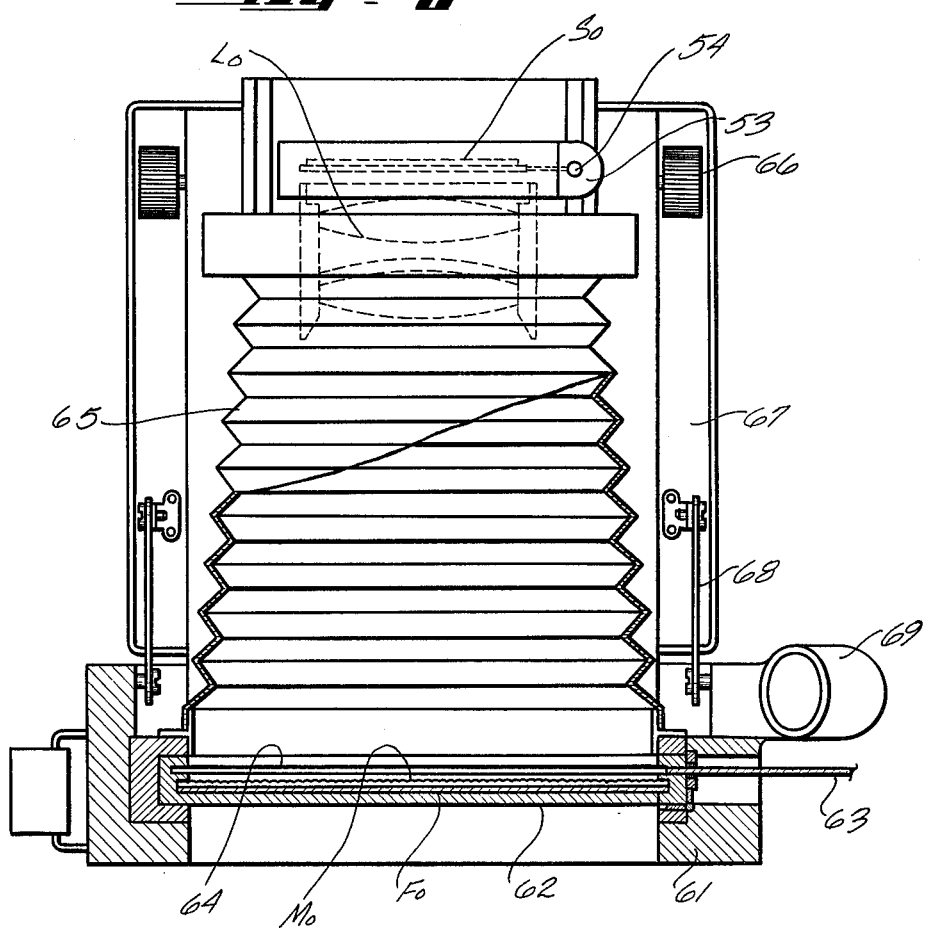
FIG. 8 is a plan view with cross-section in part illustrating the preferred embodiment of this invention wherein a dry plate is used as the sensitive material.

FIG. 8 shows the camera of this invention having the gap shutter which also functions as the diaphragm as described above. In the embodiment of FIG. 8, the shutter $S_0$ is provided in front of the objective $L_0$ by utilizing the frame thereof rather than behind the objective $L_0$ between thereof and the sensitive material $F_0$. In this embodiment, the shutter $S_0$ is mounted inside a closed frame to form a shutter unit which is removable for the convenience of carrying out inspection and adjustment of the shutter. In FIG. 8, 61 designates a camera body in the box form. A plate holder 62 housing the sensitive material $F_0$ and the lenticular screen $M_0$ positioned immediately in front thereof is removably mounted to the camera body in the known manner. In performing the photography, a light shielding plate 63 being inserted in front of the lenticular screen $M_0$ to protect exposure of the sensitive material $F_0$ is pulled out from the mounted plate holder 62. 64 is a groove for sliding the light shielding plate 63. Other members are: 65 is a bellows, 66 a rotating knob for focus adjustment, 67 a front cover which is adapted to be folded by a hinge 68, and 69 is a grip for holding the camera. All these members are provided similarly as those in the known camera.

Figure 9:
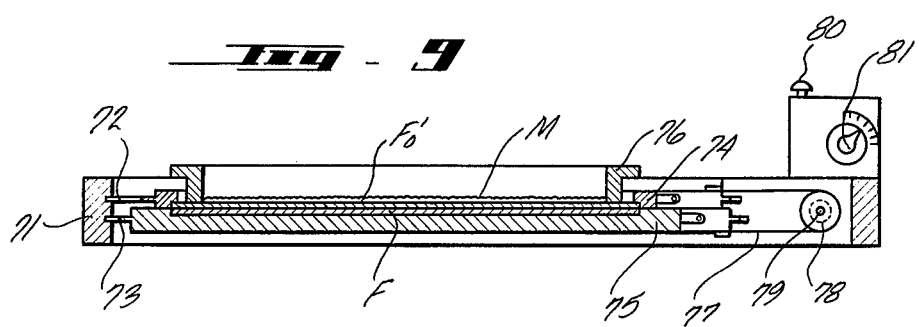
FIG. 9 is a side elevational view with cross-section in part illustrating a printer which effects conversion of the reversed three dimension image and printing of corresponding three dimension image in normal form on the fresh sensitive material based on the original having the reversed three dimension image which has been exposed by the camera of this invention and developed. A light source is omitted in this Figure.

FIG. 9 shows the embodiment of the device which performs conversion of the reversed three dimension image and printing as described in FIG. 2. In FIG. 9 the light source is omitted. A printer body 71 has inside thereof upper and lower slide grooves 72 and 73. A frame 74 holding the original $F_0'$ and a frame 75 holding the fresh senstive material F are adapted to move horizontally in the slide grooves 72 and 73 respectively. Above the upper frame 74 there is positioned a separate frame 76 which is to be secured to the body 71. The lenticular screen M fixed to the undersurface of the frame 76 is positioned over the original $F_0'$ and in close contact therewith. At one side of each of the movable frame 74 and 75 each end of a belt 77 is fixed, and said belt 77 is adapted to run about a pulley 78, so that the frame 74 and the frame 75 move in opposite directions. A shaft 79 of the pulley 78 is connected to a motor (not shown) through the known reduction gear mechanism (not shown) in order that the rotation of the motor renders the pulley 78 to make an extremely slow rotating movement. 80 is a switch button for controlling the operation of the motor, and 81 is a revolving knob having an indicator for synchronizing the time for motor operation and the time during which the lamp of light source is lit.

It will be obvious that there are other improvements and modifications possible within the scope of the present invention. However, it should be noted that within the scope of the present invention the lenticular screen provides numerous projected images that can be three dimensionally viewed and these are formed transversely of the stripes formed by the lenticular elements. Therefore it is important to employ an objective with an effective aperture extending in a direction along which the projected images are formed. In order to achieve such an arrangement according to the preferred embodiment of the invention, the shutter has its aperture elongated and extending transversely of the stripes formed by the lenticular elements and the objective has any area extending outward from the effective aperture blocked so that it is not utilized.

An original carrying thereon the reversed three dimensional picture which has been obtained by the photographic camera according to the present invention is preferably a negative which may be either of a monochromatic type or a color type.

What is claimed is:

1. A photographic camera for three dimensional photography comprising:
    means for positioning photosensitive material at a position for exposure;
    a lenticular screen positioned for close contact with such positioned photosensitive material, the screen comprising a plurality of lenticular elements, the boundaries of adjacent elements forming lines which define stripe portions;
    an objective for projecting an object image to be photographed through said lenticular screen onto such photosensitive material; and
    a shutter comprising plate shaped shutter blades relatively movable between open and closed conditions during exposure and so positioned and defining, when open, an aperture gap which is elongated transversely of the stripe portions to allow projection of the object image to the photosensitive material and, when closed, interrupts the projection,
      the objective having an effective aperture defined by a pair of planes extending parallel to each other at opposite sides of a main optical axis and transversely to said stripe portions so that a single exposure by said shutter, when open, enables such object image to be projected on the photosensitive material as a reversed image;
      the photosensitive material and the lenticular screen being maintained at a fixed position during the open condition of the shutter blades 2. A camera according to claim 1 wherein said plate shaped blades comprises a pair of blades having opened and closed positions, said blades, when closed, covering the effective area of the objective and, when open, providing said effective aperture by the amount of displacement between said blades.

3. A camera according to claim 1 wherein said objective comprises a frontal shape which is a relatively slender rectangle providing said effective aperture.

4. A camera according to claim 2 comprising an electromagnetic means, effective when excited, for moving the blades apart to an open position providing a rectangular effective aperture for the objective.

5. A camera according to claim 2 wherein the shutter also forms a diaphragm for control of amount of incident light comprising means for relatively moving said blades apart various predetermined amounts corresponding to predetermined desired exposure.

6. A camera according to claim 5 comprising means for selecting the predetermined amount of exposure and means for effecting a corresponding amount of relative movement apart of said blades.

7. A camer according to claim 2 wherein said shutter also forms a diaphragm for control of amount of incident light comprising:
electromagnetic means;
a member driven by the electromagnet, when excited, to in turn relatively move said blades; and
a further member adapted to regulate the amount of movement of said driven member.

8. A camera according to claim 2 wherein said sutter also forms a diaphragm for control of incident light comprising:
electromagnetic means, effective when excited, for moving the blades apart, and a control member positionable, in the travel of at least one of said blades, to any one of different positions according to corresponding diaphragm values for regulating the extent to which said shutter blades move apart.

9. A photograhic camera for three dimensional photography comprising:
means for fixedly positioning photosensitive material at a position for exposure during an exposure process;
a lenticular screen positioned for close contact with such positioned photosensitive material, the screen comprising a plurality of lenticular elements, the boundaries of adjacent elements forming lines which define stripe portions;
an objective for projecting an object image to be photographed through said lenticular screen onto such photosensitive material;
a shutter comprising plate shaped shutter blades so positioned and defining, when open, an aperture gap which is elongated transversely of the stripe portions to allow projection of the object image to the photosensitive material and, when closed, interrupts the projection;
an electromagnet for driving said shutter blades to said open position;
a control member for regulating the extent to which said shutter blades are opened by said electromagnet to thereby cause the extent of opening of said blades to provide a diaphragm aperture controlling the amount of incident light; and
means for controlling the period of time said electromagnet is excited to thereby control exposure time;
the objective having an effective aperture defined by a pair of planes extending parallel to each other at opposite sides of a main optical axis and transversely to said stripe portions so that a single exposure by said shutter, when open, enables such object image to be projected on the photosensitive material as a reversed image.

10. A photograhic camera for three dimensional photography comprising:
means for positioning photosensitive material with a surface thereof for exposure;
a lenticular screen positioned in a path for light from an object to be photographed and positioned closely adjacent to and in fixed relative position to such surface of photosensitive material for projecting such light onto such surface, the screen comprising a plurality of lenticular elements, the boundaries of adjacent elements forming lins which define stripe portions;
an objective positioned in such path for light for projecting such light through said lenticular screen onto such photosensitive material; and
a shutter for interrupting such light from such surface comprising means for providing, when open, a substantially rectangular shaped aperture gap which is elongated along one dimension of the rectangular shape transversely of the stripe portions and opens and closes with relative movement between opposing sides of the rectangular shape in a direction substantially transverse to said one dimension,
the objective having an effective aperture defined by a pair of planes extending parallel to each other at opposite sides of a main optical axis and transversely to said stripe portions so that a single exposure, by opening of said shutter, enables such light to be projected on the photosensitive material as a reversed image;
the photosensitive material and the lenticular screen being maintained at a fixed position when the shutter is open.

11. A camera according to claim 10 wherein said lenticular elements are each elongated.

12. A camera according to claim 10 wherein said lenticular elements are each substantially semicircular in cross-section.

13. A camera according to claim 11 wherein said lenticular elements are each elongated and of substantially constant curvature along the length thereof.

14. A camera according to claim 10 wherein each lenticular element has a unique area on such surface of the photosensitive material corresponding thereto, each said lenticular element being adapted to direct any of such light which is received thereby substantially only to the corresponding surface area of such photosensitive material.

15. A camera according to claim 10 wherein said plate shaped shutter comprises at least a pair of plate shaped blades, having opened and closed positions, said blades, when closed, covering the effective area of the objective and, when open, defining said effective aperture by the amount of displacement between said blades.

16. A camera according to claim 15 wherein said objecgive comprises a frontal shape which is a relatively slender rectangle providing said effective aperture.

17. A camera according to claim 15 comprising an electromagnetic means, effective when excited, for moving the blades apart to an open position providing a rectangular effective aperture for the objective.

18. A camera according to claim 15 wherein the shutter also forms a diaphragm for control of amount of incident light comprising means for relatively moving said blades apart various predetermined amounts corresponding to predetermined exposure.

19. A camera according to claim 18 comprising means for selecting the predetermined amount of exposure and means for effecting a corresponding amount of relative movement apart of said blades.

20. A camera according to claim 15 wherein said shutter also forms a diaphragm for control of amount of incident light comprising:
electromagnetic means, a member driven by the electromagnet, when excited, to in turn relatively move said blades, and a further member adapted to regulate the amount of movement of said driven member.

21. A camera according to claim 20 wherein said shutter also forms a diaphragm for control of incident light comprising:

electromagnetic means, effective when excited for moving the blades apart, and a control member positionable, in the travel of at least one of said blades, to different positions according to diaphragm values for regulating the extent to which said shutter blades move apart.

22. A camera according to claim 20 including a control circuit for exciting said electromagnet for a selected time interval according to a required exposure time.

23. A method for obtaining a three dimensional photographic image of an object comprising the steps of:
forming a photographic image comprising the steps of positioning a lenticular screen having predetermined optical characteristics adjacent to an exposure surface of a photosensitive material and in fixed relative position therewith during exposure;
projecting an object image through said screen and onto such surface to thereby expose and form a reversed three dimension image on said photosensitive material;
reversing the reversed image comprising the steps of positioning a lenticular screen, having substantially said predetermined characteristics, closely adjacent an original transparency carrying a developed form of the reversed three dimension image;
positioning a surface of fresh photosensitive material closely adjacent a surface of such original which is opposed from the lenticular screen;
projecting a beam of light through said lenticular screen and through said original to a surface of said fresh photosensitive material; and
while projecting, moving at least two of the following elements: said lenticular screen, said original, said fresh photosensitive material, and said beam of light, said movement being relative to said at least two elements and being relative to the others of said elements to thereby reverse the reversed three dimension image and create a non-reversed trivision image on said fresh photosensitive material.

24. A method according to claim 23 in which the step of relatively moving comprises the step of moving the original and the fresh photosensitive material in opposite directions and relative to the lenticular lens and beam of light.

25. A method according to claim 23 wherein the screen comprises a plurality of lenticular elements, the boundaries of adjacent elements forming lines which define stripe portions, said step of moving comprising the step of moving the original and the fresh photosensitive material in transverse directions with respect to said stripe portions.

26. Apparatus for obtaining a non-reversed three dimensional photographic image of an object comprising:
photographing means comprising means for positioning an exposure surface of a photosensitive material for exposure, an objective for directing an object image to be photographed along a path toward such positioned exposure surface, a lenticular screen positioned in between said positioned surface and said objective along such path and immediately adjacent to such positioned exposure surface, and means for maintaining such positioned photosensitive material, said screen, and said objective in a fixed relative position while the shutter is opened and closed for exposure, the screen having a predetermined optical characteristic, and projecting the object image as a reversed three dimensional image on the positioned exposure surface; and
means for reversing the reversed three dimensional image comprising means for positioning an exposure surface of fresh photosensitive material, means for directing a light beam along a path toward such positioned exposure surface, means for positioning a surface of an original transparency carrying the reversed three dimensional image closely adjacent the positioned exposure surface of the fresh photosensitive material, a lenticular screen having substantially said predetermined optical characteristic and positioned in the path of the beam of light immediately adjacent a side of the original which is opposite from the fresh photosensitive material, to thereby direct the beam of light through the original to the photosensitive material, and means for relatively moving at least two of the following elements: said lenticular screen, said original, said fresh photosensitive material, and said beam of light, said movement being relative to said at least two elements and being relative to the others of said elements to thereby reverse the reversed three dimensional image and create a non-reversed three dimensional image on said fresh photosensitive material.

27. Apparatus according to claim 26 wherein the means for relatively moving comprises means for moving the original and the fresh photosensitive material in opposite directions and relative to the lenticular lens and the beam of light.

28. Apparatus according to claim 26 wherein the screen comprises a plurality of lenticular elements, the boundaries of adjacent elements forming lines which define stripe portions, the means for moving comprising means for moving the original and the fresh photosensitive material in transverse directions with respect to the stripe portions.

29. A photographic camera according to claim 2 wherein said pair of blades move relative to an optical axis between open and closed conditions.

30. A photographic camera according to claim 15 wherein said pair of blades move relative to an optical axis between open and closed conditions.

* * * * *

UNITED STATES PATENT AND TRADEMARK OFFICE
CERTIFICATE OF CORRECTION

PATENT NO. : 4,107,711
DATED : Aug. 15, 1978
INVENTOR(S) : LAW, Chi Yin

It is certified that error appears in the above-identified patent and that said Letters Patent are hereby corrected as shown below:

```
Column 1, lines 51-52 "trivision" should be -- three dimensional --;
Column 2, line 34, "mechwnism" should be -- mechanism --;
          line 38, "metod" should be -- method --;
Column 3, line 2, "mateerial" should be -- material --;
          line 47, "t6wo" should be -- two --;
          line 57, "e" should be -- be --;
Column 12, line 17, "regulatin" should be -- regulating --;
Column 16, line 42 "objecgive" should be -- objective --;
Column 17, lines 38-39, "trivision" should be -- three dimension --.
```

Signed and Sealed this

Thirteenth Day of March 1979

[SEAL]

Attest:

RUTH C. MASON
*Attesting Officer*

DONALD W. BANNER
*Commissioner of Patents and Trademarks*